(12) United States Patent
Theophil et al.

(10) Patent No.: US 7,716,578 B2
(45) Date of Patent: May 11, 2010

(54) DISPLAY METHOD, COMPUTER PROGRAM PRODUCT AND COMPUTER SYSTEM

(75) Inventors: Sebastian Theophil, Berlin (DE); Arno Schoedl, Berlin (DE); Markus Hannebauer, Berlin (DE)

(73) Assignee: Think-Cell Software GmbH, Berlin (DE)

( * ) Notice: Subject to any disclaimer, the term of this patent is extended or adjusted under 35 U.S.C. 154(b) by 1027 days.

(21) Appl. No.: 11/437,422

(22) Filed: May 19, 2006

(65) Prior Publication Data
US 2007/0271500 A1 Nov. 22, 2007

(51) Int. Cl.
*G06F 17/00* (2006.01)
(52) U.S. Cl. ............... 715/243; 715/731; 715/217; 715/244; 715/246
(58) Field of Classification Search ............ 715/731, 715/217, 243, 244, 246
See application file for complete search history.

(56) References Cited

U.S. PATENT DOCUMENTS 5,622,178 A    4/1997  Gilham
7,131,060 B1   10/2006 Azuma
2005/0179684 A1*  8/2005  Wallace ............... 345/419
2007/0109301 A1   5/2007  Smith
2008/0072165 A1   3/2008  Theophil et al.

OTHER PUBLICATIONS

Simon Lok, 'A Survey of Automated Layout Techniques for Information Presentations', Smark Graphics 2001, pp. 1-8.*
Office Action mailed Nov. 25, 2009, U.S. Appl. No. 11/531,866.
Diploma Thesis "Automatic Chart Labeling", Sebastian Müller (now Sebastian Theophil) Berlin, Oct. 18, 2005.
Office Action mailed Jan. 22, 2009, U.S. Appl. No. 11/531,866.
Final Office Action mailed Jun. 19, 2009, U.S. Appl. No. 11/531,866.

* cited by examiner

*Primary Examiner*—Stephen S Hong
*Assistant Examiner*—Matthew J Ludwig
(74) *Attorney, Agent, or Firm*—Martin Fleit; Paul D. Bianco; Fleit Gibbons Gutman Bongini & Bianco PL

(57) ABSTRACT

The present invention relates to a display method. The display method includes displaying a labeled column chart on a graphical user interface, where the column chart having a plurality of labels. The display method further includes entering a first modification of one of the labels via a graphical user interface by a user and starting execution of labeling instructions that implement a labeling algorithm for generating a first modified labeled column chart in response to the entry of the first modification. The first modified labeled column chart is displayed.

16 Claims, 14 Drawing Sheets

DISPLAY METHOD, COMPUTER PROGRAM PRODUCT AND COMPUTER SYSTEM

FIELD OF THE INVENTION

The present invention relates to the field of data processing, and more particularly to column chart labeling.

BACKGROUND AND RELATED ART

A chart, also referred to as a graph, is a useful visual tool for communicating numeric and/or other information in a concise and intuitive format. A particular type of chart is a column chart in which numeric information is visualized as stacks of rectangular segments. Each of the stacks of rectangular segments forms a column. A bar chart is a very similar kind of chart in which the segments are arranged horizontally rather than stacked vertically. The segments usually carry labels to show the value of the numeric information that is represented by the respective segment.

For creation of a column chart using Microsoft PowerPoint the numeric information to be visualized in the column chart needs first to be entered into a so-called data sheet. The data sheet is a grid that resembles a spreadsheet for entry of the numeric information. Alternatively it is also possible to enter the numeric information into a Microsoft Excel spreadsheet.

After entry of the numeric information into the data sheet or spreadsheet is completed, the data sheet or spreadsheet is closed and the respective column chart is generated and displayed whereby the height of the columns or column segments is in proportion to the assigned numeric information.

SUMMARY OF THE INVENTION

In accordance with the present invention there is provided a display method comprising displaying a labeled column chart on a graphical user interface, the column chart having a plurality of labels, entering a modification of one of the labels via the graphical user interface by a user, starting execution of labeling instructions that implement a labeling algorithm for generating a modified labeled column chart in response to the entry of the first modification, displaying the modified labeled column chart.

It is to be noted that the term column chart as used herein also encompasses bar charts. For ease of explanation only and without restriction of generality the following summary describes column charts having vertically oriented segments.

Embodiments of the invention are particularly advantageous as they facilitate to display the numeric information being assigned to one of the columns or column segments of the column chart within a textual label assigned to that column segment without a need to view a data sheet or spreadsheet in addition. Further, this facilitates to directly edit the labels of the labeled column chart without having to go through the intermediary of a data sheet or spreadsheet.

Furthermore, the present invention is particularly advantageous as the labeling algorithm is started in response to the entry of a modification of one of the labels. This enables to provide immediate feedback to a user as to the effect of the modification on the labeled column chart.

In accordance with an embodiment of the invention each of the labels is contained in a separate graphical object, such as a text field. As a result of the execution of the labeling algorithm all graphical objects are placed within the column chart, e.g. on their respective columns or column segments, next to a column or above a column. For editing a label a user can open the graphical object that contains the label, such as by clicking on the graphical object with a computer mouse. After the graphical object has been opened the user can enter a modification of the label by means of a keyboard that is coupled to the computer. With each keystroke by which a character is added, replaced or deleted the labeling algorithm is restarted in order to adapt the layout of the labeled column chart accordingly. After the modification of the label has been completed, the graphical object is closed. Subsequently the user can open another one of the graphical objects for editing another label.

In accordance with an embodiment of the invention execution of the labeling algorithm is terminated when a subsequent modification is entered while processing of the labeling algorithm due to a previous modification is still ongoing. In response to the subsequent modification the labeling algorithm is reset and restarted. For example, execution of the labeling instructions that implement the labeling algorithm is restarted with each keystroke by which a user enters an additional character into a label, deletes a character or replaces a character by another character. Hence, an updated labeled column chart that has been generated by execution of the labeling instructions is only displayed if the processing of the labeling algorithm has been completed before a new modification is entered.

In accordance with an embodiment of the invention the time duration for complete execution of the labeling instructions is below 500 milliseconds, preferably below 150 milliseconds. If the computer system that is used to run the labeling instructions has sufficient processing capacity this has the advantage that the required processing time for complete execution of the labeling instructions can be below the frequency with which a typical user can perform subsequent keystrokes. As a consequence the graphical user interface gives the user the impression that immediately after each keystroke an updated labeled column chart is displayed that reflects the effect of that keystroke on the layout of the column chart and its labeling.

In accordance with an embodiment of the invention the labeling instructions implement a labeling algorithm that attempts to maximize the number of labels that are placed on their respective column segment while a number of constraints are satisfied. In particular all of the following constraints need to be satisfied:

a. labels must not intersect or overlap with each other.
b. labels that have a form and size that would completely cover their respective segment if they were placed on the segment need to be placed elsewhere, e.g. next to their column or above or below the column.
c. labels can be horizontally displaced (staggered) to fit more labels if none of these labels is wider than half the column width.
d. a label can only be placed next to its column, if the space next to the column, i.e. the distance to the neighboring column, is wider than the label. The user may choose to place the labels to the right (default) or left of the column.

In accordance with an embodiment of the invention additional constraints may apply after one of the labels has been moved above the column.

In another aspect the present invention relates to a computer program product for column chart labeling.

In accordance with an embodiment of the invention the computer program product is implemented as a so called plug-in. The plug-in is interoperable with a presentation program, such as Microsoft PowerPoint or the like.

BRIEF DESCRIPTION OF THE DRAWINGS

In the following, embodiments of the invention are explained in greater detail by way of example only making reference to the drawings in which.

DETAILED DESCRIPTION

For ease of explanation only and without restriction of generality the following detailed embodiments show column charts having vertically oriented segments.

Figure 1:
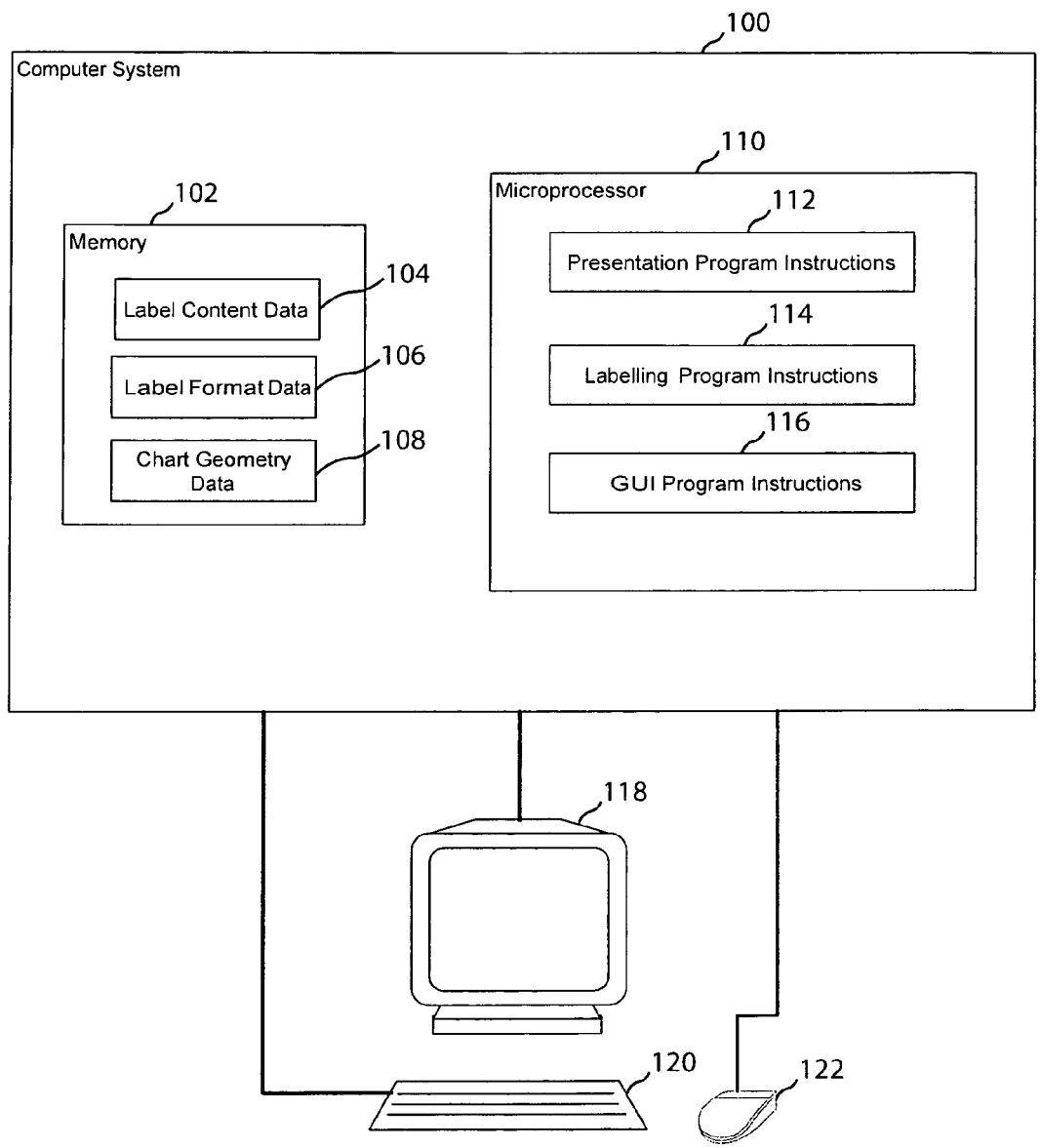
FIG. 1 is a block diagram of a first embodiment of a computer system.

FIG. 1 shows a block diagram of a computer system 100 that has a memory 102 for storing data that specifies a column chart, such as label content data 104, label format data 106 and chart geometry data 108. The label content data 104 has a data item for each label. For example, each data item is a numerical value that specifies the height of the column segment to which it is assigned.

The label format data 106 contains the specification of the formatting of the data items contained in the label content data 104, such as character size, font type, bold type, italics, etc. The size of a given label is thus determined by the data item it carries and the format with which the data item is to be displayed within the label.

The chart geometry data 108 contains a specification of the overall layout of the column chart, such as the width of the columns, the spacing between the columns and other column formatting information, such as line width, line style, colors, etc.

The memory 102 can be the working memory of the computer system 100 or a non-volatile memory, such as a storage disc.

The computer system 100 has at least one microprocessor 110 for execution of presentation program instructions 112, labeling program instructions 114 and graphical user interface (GUI) program instructions 116.

The presentation program instructions 112 constitute a presentation program, such as Microsoft PowerPoint or a similar program. The labeling program instructions 114 implement a labeling algorithm for labeling a column chart in accordance with the label content data 104 and the label format data 106. Preferably the labeling program instructions 114 perform the labeling of the column chart fully automatically within the limits set by predefined layout constraints.

In the embodiment considered here the labeling program instructions 114 constitute a so-called plug-in for the presentation program. The presentation program instructions 112 and the labeling program instructions 114 are thus interoperable insofar as the labeling program instructions 114 can place the labels of a column chart displayed by the presentation program.

Further, the microprocessor 110 serves for execution of graphical user interface (GUI) program instructions 116 that generate a GUI, such as the Microsoft Windows or Apple MacOS user interface.

The computer system 100 is coupled to a computer monitor 118, a keyboard 120 and a computer mouse 122. The labeled column chart is displayed on the monitor 118. By means of the computer mouse 122 and/or the keyboard 120 a user can enter modifications of the labels, such as by editing the labels, via the GUI.

In operation the column chart is displayed by means of the presentation program instructions 112. The labeling program instructions 114 are invoked in order to label the column chart using the label content data 104 and the label format data 106. The resultant labeled column chart is displayed on the monitor 118.

When a user enters a modification of one of the labels displayed as part of the labeled column chart this automatically invokes execution of the labeling program instructions 114 in order to update the labeled column chart in view of the modified label content and/or label format entered by the user. This is particularly advantageous as entering a modification does not require opening a data sheet or spreadsheet. Rather the modification can be entered directly by editing the displayed label and the updated labeled column chart is generated and displayed automatically without requiring further user interaction.

Figure 2:
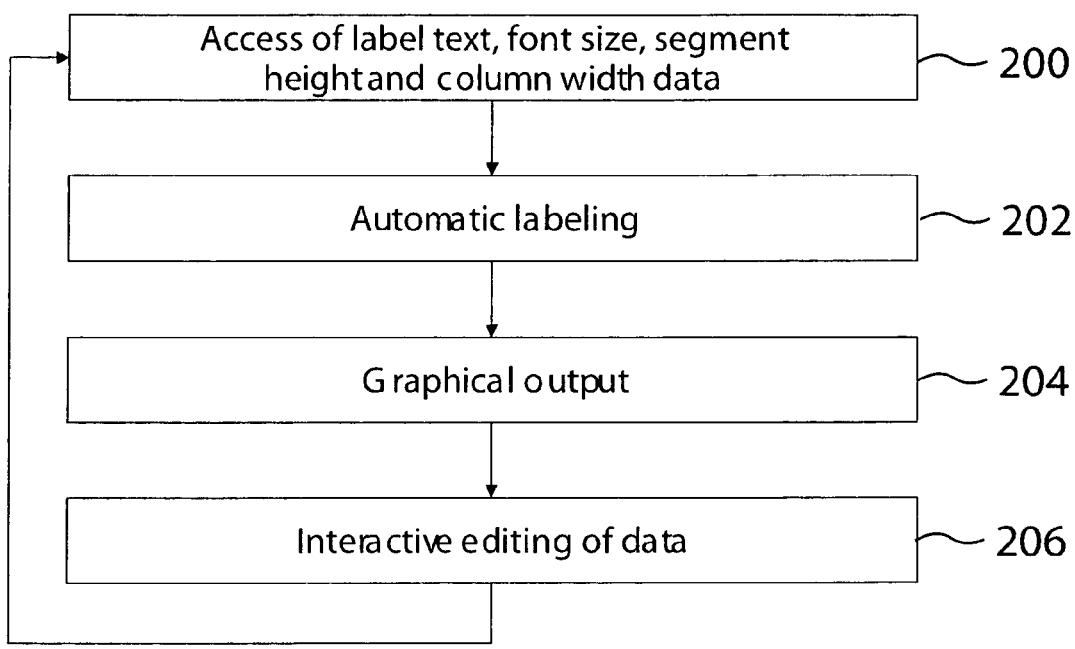
FIG. 2 is a flowchart illustrating an embodiment of a method of the invention.

FIG. 2 shows a flowchart illustrating a method of the invention. In step 200 label content data, label format data and/or chart geometry data is accessed, such as data specifying label text, font size, segment heights and column width. In step 202 a column chart to which the specified labels relate is labeled automatically and the resultant labeled column chart is output graphically in step 204. In step 206 a user interactively edits the data that specifies the labels. In response the control goes back to step 200 in order to restart the automatic labeling based on the modified label specification.

Figure 3:
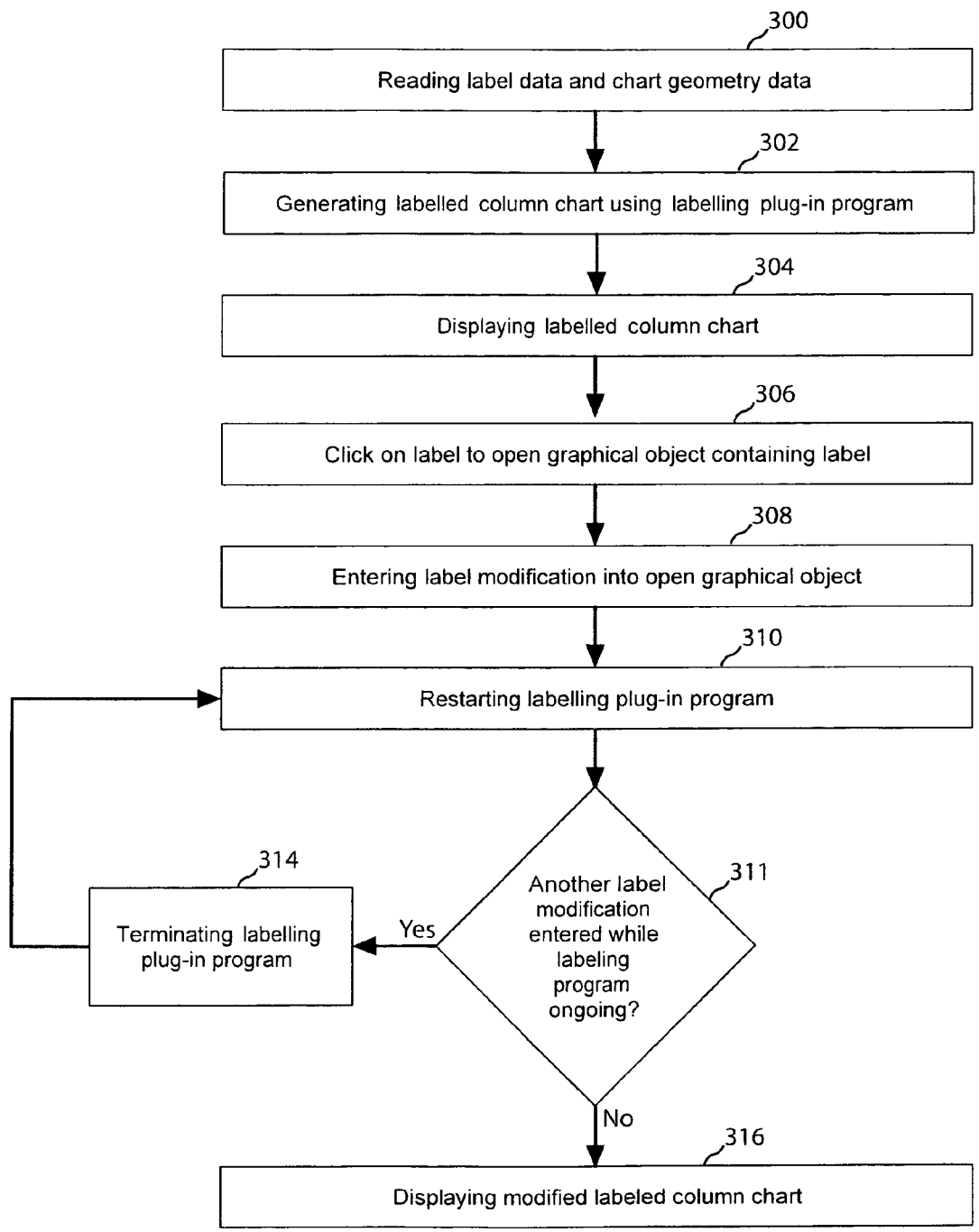
FIG. 3 is a flowchart illustrating a more detailed embodiment of a method of the invention.

FIG. 3 shows a more detailed embodiment of a method of the invention. In step 300 label data, such as label content and label format data, as well as chart geometry data is read from memory. A labeled column chart is generated in step 302 by means of a plug-in program (cf. program instructions 114 of FIG. 1) that is used to perform the labeling operation on the basis of the data read in step 300.

In step 304 the labeled column chart is displayed on a graphical user interface. In step 306 the user initiates an editing operation in order to input a label modification. For this purpose the user clicks on the label to be edited with the computer mouse (cf. computer mouse 122 of FIG. 1) in order to open the graphical object that contains the label.

For example, each label of the labeled column chart is contained in a separate graphical object, such as a text field. When the user clicks on the text field, the text field opens and a cursor is shown in the text field for editing the label shown in the text field.

The label modification is entered by the user into the open graphical object in step 308. This can be done by means of the computer mouse 122 and/or the keyboard 120 (cf. FIG. 1). For example, if the user depresses one of the keys of the keyboard 120 in order to add a character to the label, to replace a character by another character, delete a character and/or change the label format, this automatically restarts the labeling plug-in program (step 310).

Independently from the ongoing execution of the labeling plug-in program the user can enter a subsequent label modification, such as by another keystroke on the keyboard 120. In step 311 it is determined whether such a subsequent label modification was entered before the execution of the labeling plug-in program that was started in step 310 finished.

If the labeling plug-in finished prior to any subsequent label modification, the control goes to step 316 in order to display the update of the labeled column chart on the basis of the entered label modifications. If the contrary is the case the control goes from step 311 to step 314 in order to terminate execution of the labeling plug-in program as further processing of the labeling algorithm by the plug-in program is of no interest anymore due to the subsequently entered label modification.

From step 314 the control goes to step 310 in order to restart the labeling plug-in program on the basis of the up-to-date label modifications as entered in step 308 and/or during execution of steps 310 and/or 311.

It is to be noted that execution of the steps 310, 311, 314 and 316 is initiated with each subsequent entry of a label modification. After all modifications have been entered into the label whose graphical object has been opened in step 306, the user can perform another mouse click in order to close that graphical object and/or in order to open another graphical object containing another label for entering label modifications for that other label.

Figure 4:
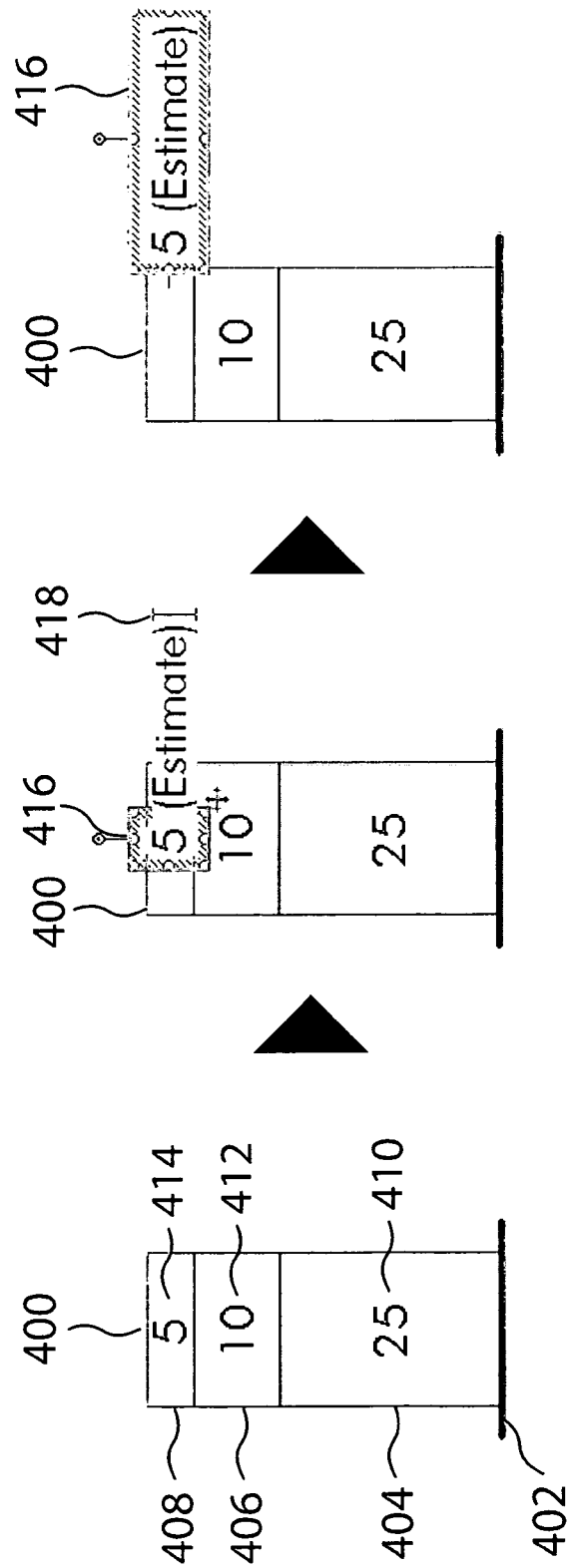
FIG. 4 illustrates entry of a label modification and its effect on the displayed labeled column chart.

FIG. 4 shows a single column 400 of a labeled column chart by way of example. The column 400 is placed on a baseline 402 as well as all other columns of the column chart that are not shown in FIG. 4 for ease of explanation. In the example considered here the column 400 has three stacked column segments 404, 406 and 408 that constitute the column 400. The column segment 404 has a label 410 with the label text '25'. The column segment 406 has a label 412 with the label text '10' and the column segment 408 has a label 414 with the label text '5'. The heights of the column segments are in proportion to the numerical values given in the respective label texts. As shown in FIG. 4 the labels 410, 412 and 414 have label sizes that fit onto the respective column segments which is the ideal situation.

For editing the label 414 the user clicks onto the label 414 which opens the text field 416 that contains the label 414 as shown in the middle of FIG. 4. As a consequence the cursor 418 is shown in the opened text field 416. Next, the user can enter a modification of the label 414 such as by entering additional characters into the opened text field 416 by means of the keyboard 120 (cf. FIG. 1).

In the example considered here the user types in '(Estimate)' after the original label text '5'. In response the labeling plug-in program is restarted in order to update the labeled column chart. As the modified label 414 with the label text '5 (Estimate)' is too large to fit onto its column segment 408, the modified label 414 is placed next to the column 400 in accordance with the labeling algorithm implemented by the plug-in program as shown in FIG. 4.

Figure 5:
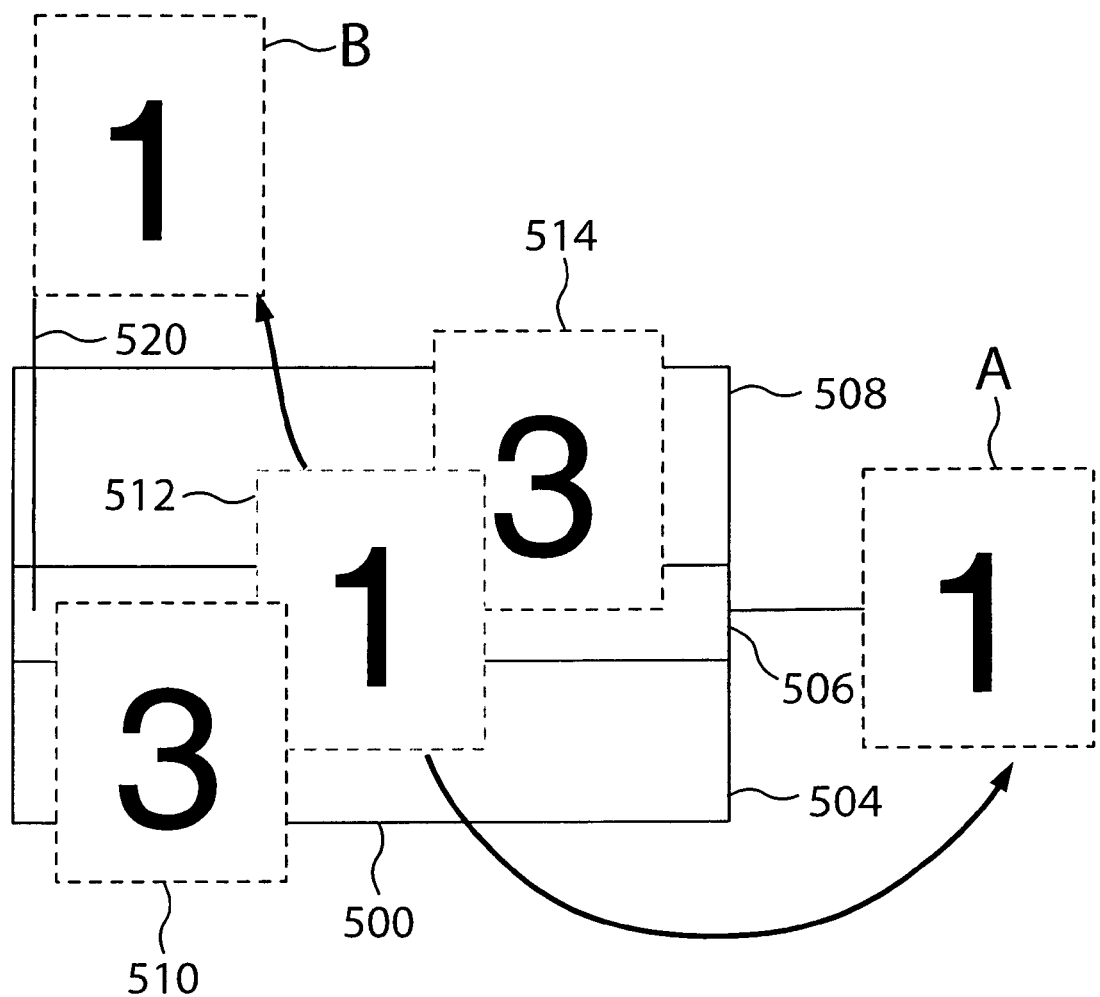
FIG. 5 illustrates a first constraint of the labeling problem.

FIG. 5 shows a portion of a column 500 having column segments 504, 506 and 508. A label 510 containing the label text '3' is assigned to the column segment 504, a label 512 carrying the label text '1' is assigned to the column segment 506 and a label 514 carrying the label text '3' is assigned to the column segment 508. Each of the labels 510, 512 and 514 is implemented as a text field as indicated by the dashed lines that delineate the labels as shown in FIG. 5.

As also shown in FIG. 5 the labels 510 and 514 overlap with the label 512 if all three labels are placed on their respective segments. However, overlapping labels are not allowed. In order to satisfy the respective constraint the labeling algorithm can move the label 512 next to the column 500 (position A), if there is enough space between the column 500 and its neighboring column (not shown in FIG. 5).

If moving the label 512 to position A next to the column 500 is not possible, the labeling algorithm can satisfy the constraint by moving the label 512 above the column 500 to position B. In order to visualize the assignment of the label 512 when it is placed in the position B to its column segment 506 a line 520 connecting the label 512 and its column segment 506 is displayed.

Figure 6:
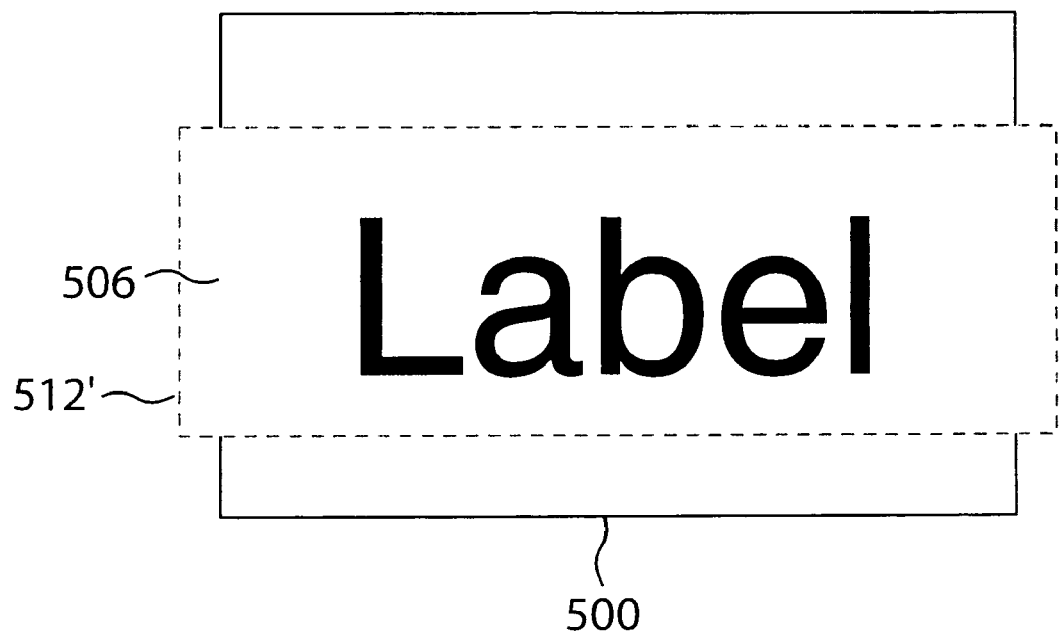
FIG. 6 illustrates a second constraint of the labeling problem.

FIG. 6 illustrates a situation where the label 512' that is assigned to the column segment 506 has a size and shape that completely covers the segment to which it is assigned, i.e. the column segment 506, if it would be placed on this column segment. Such a placement of the label 512' is not allowed. The respective constraint needs to be satisfied by the labeling algorithm.

Figure 7:
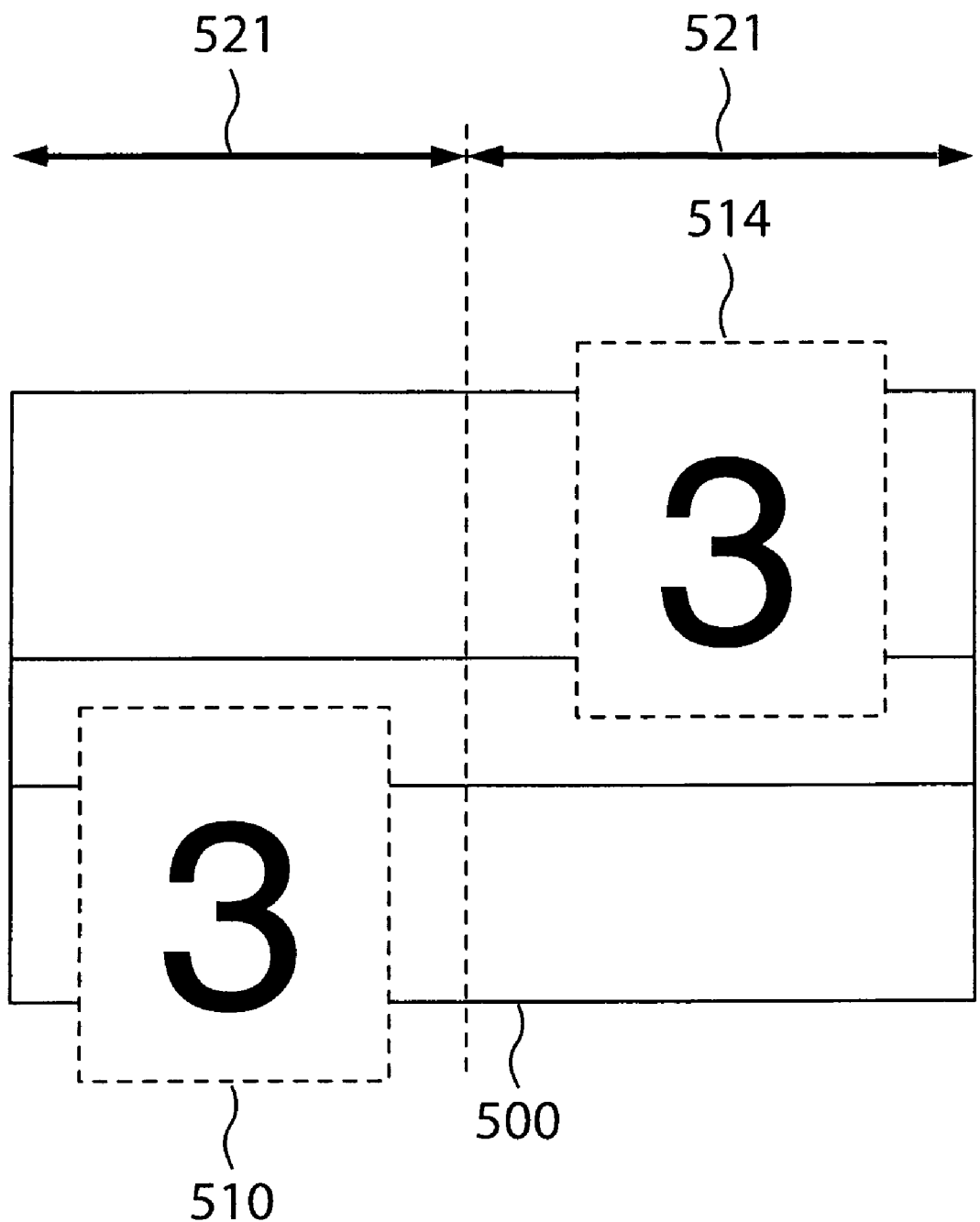
FIG. 7 illustrates a third constraint of the labeling problem.

FIG. 7 illustrates a situation where the labels 510 and 514 are staggered horizontally. Horizontal staggering is only allowed if none of these labels is wider than half the column width 521. Again, the respective constraints need to be satisfied by the labeling algorithm.

Figure 8:
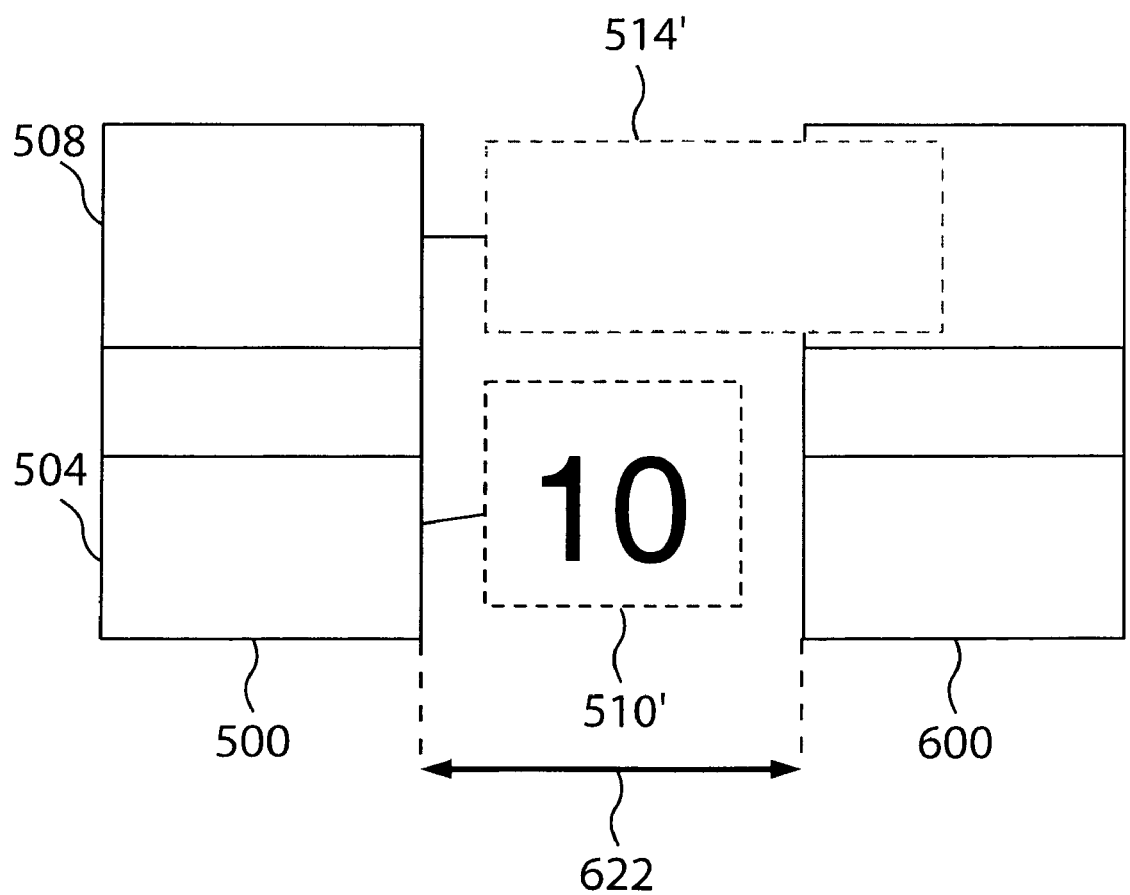
FIG. 8 illustrates a fourth constraint of the labeling problem.

FIG. 8 shows a portion of a column 600 next to the column 500. The columns 500 and 600 are spaced by a distance 622. Placing a label between the columns 500 and 600 (cf. position A of FIG. 5) is only allowed, if the distance 622 is wider than the respective label width. This constraint is satisfied for the label 510' assigned to the label segment 504 but not for the label 514' of column segment 508 that is too large to fit into the gap between the columns 500 and 600. Again, the labeling algorithm needs to satisfy this constraint when performing the labeling.

Figure 9:
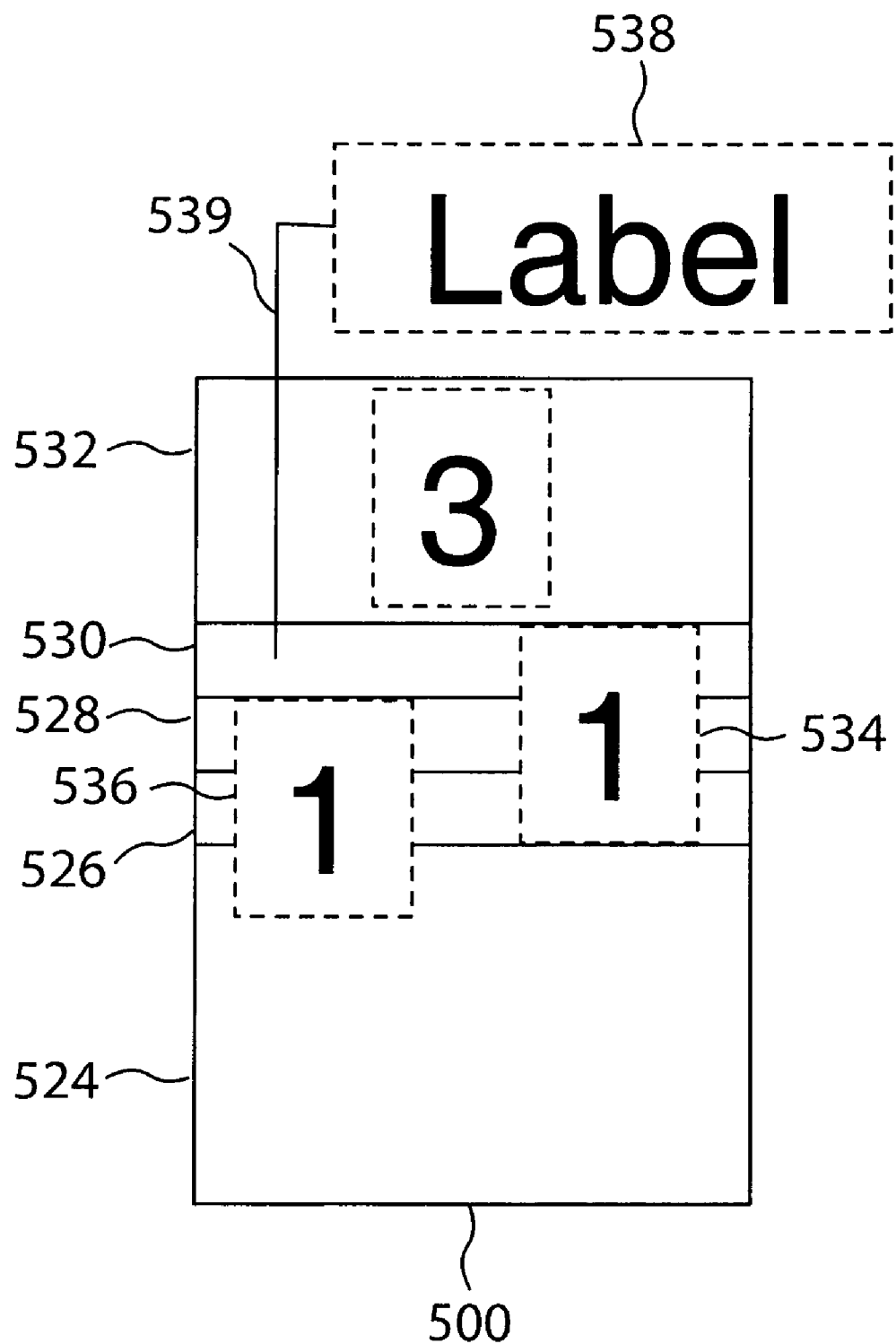
FIG. 9 illustrates a fifth constraint of the labeling problem.

FIG. 9 shows a portion of column 500 including column segments 524, 526, 528, 530 and the topmost column segment of column 500, i.e. column segment 532. Column segment 526 carries its assigned label 536 having the label text '1' and column segment 528 has an assigned label 534 carrying the label text '1'.

The column segment 530 has an assigned label 538 that needs to be placed above the topmost column segment 532 in order to satisfy the constraints. The assignment of the label 538 to its column segment 530 is visualized by means of connector symbol 539 that connects the label 538 to its column segment 530.

All column segments above the first column segment that has an assigned label placed above the column viewed from the bottom of the considered column are defined as the 'top portion' of that column. In the example considered here the column segment 532 is thus the only column segment belonging to the top portion of column 500.

Labels that are assigned to a column segment belonging to the top portion cannot be placed next to the column but can only be moved above the topmost column segment if required to satisfy a constraint. This additional constraint increases legibility and avoids a mixture of labels next to the columns and labels on top of the column. The labels that have been placed above the column constitute the 'label block' of this column.

Further, labels belonging to the top portion of a column cannot be staggered horizontally. As the column segments 528 and 526 do not belong to the top portion of the column 500 such staggering is allowed in the example considered with respect to FIG. 9.

Figure 10:
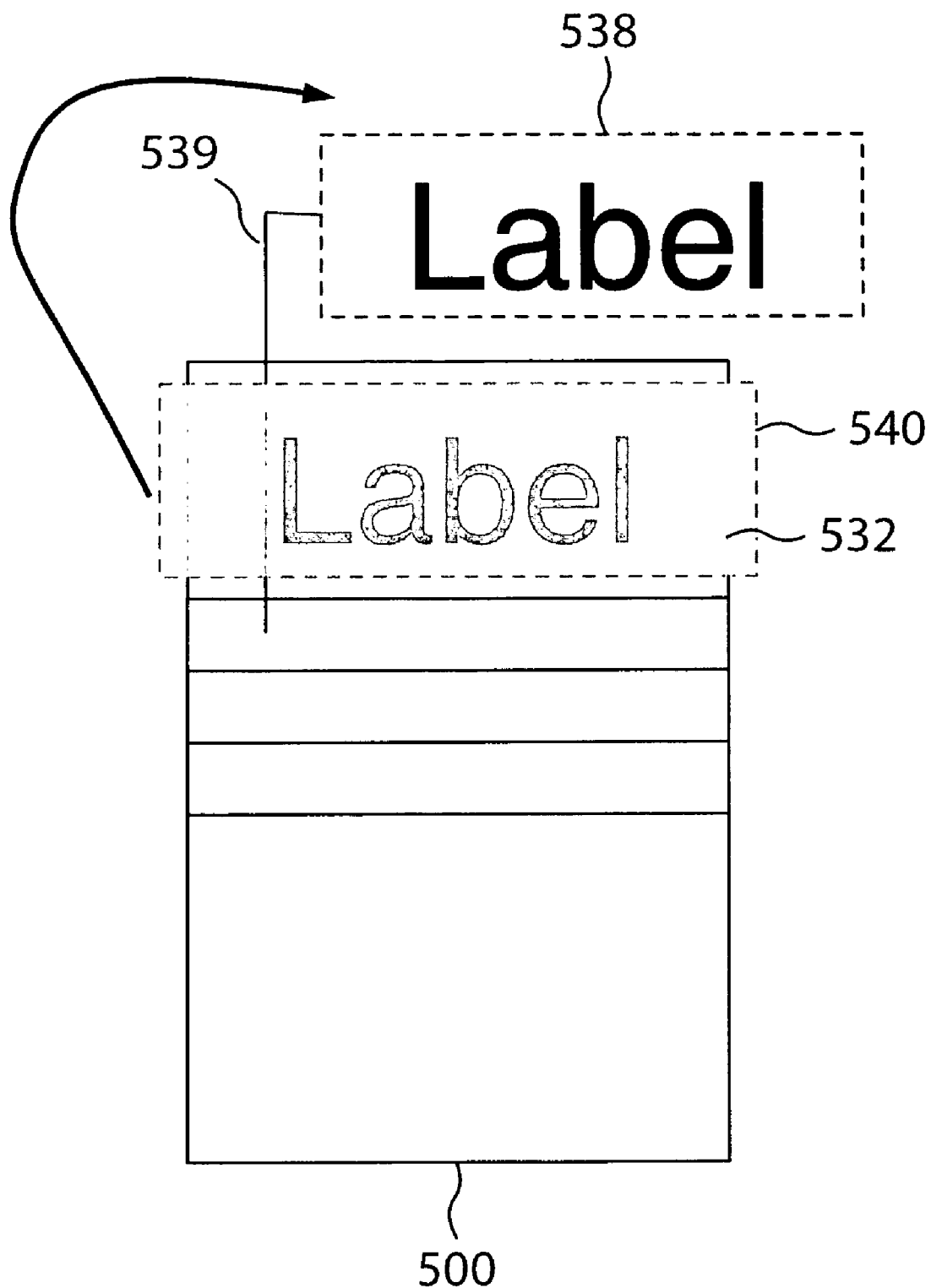
FIG. 10 illustrates a sixth constraint of the labeling problem.

FIG. 10 illustrates a situation where a label 540 that is assigned to a column segment of the top portion of column 500, i.e. column segment 532, has a label width wider than the width of the column 500. As the width of the label 540 is wider than the width of the column 500 this leaves no space for the connector symbol 539 if the label 540 would be placed on its column segment 532. The label 540 has thus to be moved above the column 500 and connected to its assigned column segment 532 by an additional connector symbol. The labels 538 and 540 constitute a label block.

Figure 11:
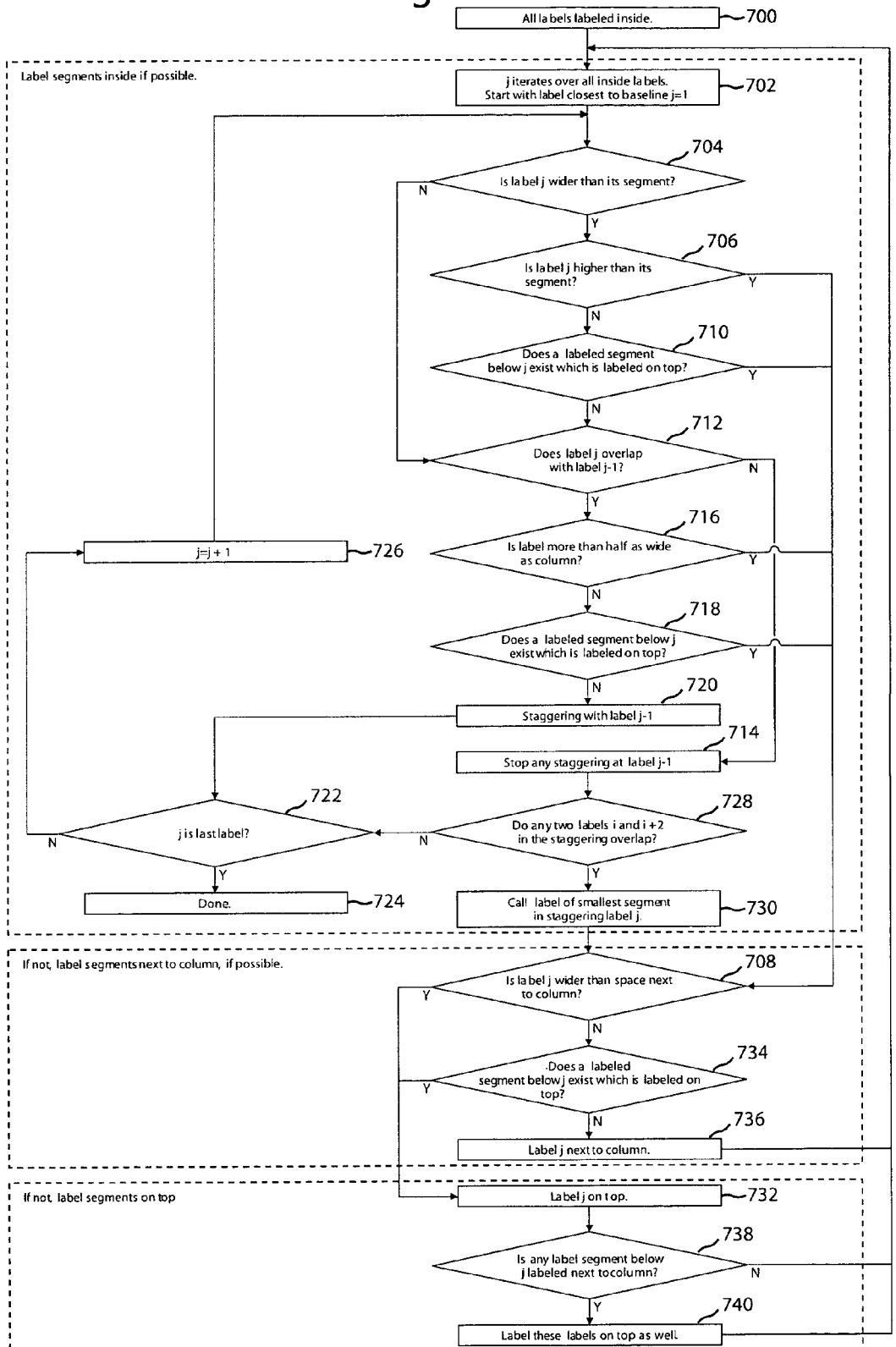
FIG. 11 is a flowchart illustrating an embodiment of the labeling algorithm for a single column of a column chart.

FIG. 11 is a flowchart illustrating an embodiment of a labeling algorithm for a single column of a column chart. In step 700 all labels are initially placed on their respective column segments. This may cause label overlaps and various other violations of the constraints as defined with respect to FIGS. 5 to 10. In step 702 processing starts with the label that is assigned to a column segment closest to the baseline of the column being processed. This label is denoted j=1.

In step 704 a determination is made whether the label j is wider than its column segment. If this is the case the control goes to step 706, where a determination is made whether the label j is higher than its segment. If this is also the case the constraint as explained with reference to FIG. 6 is violated and the control goes to step 708. If the contrary is the case the control goes to step 710 where a determination is made whether the constraint as explained with respect to FIG. 10 is violated. If this is the case the control also goes to step 708. If the contrary is true the control goes to step 712. If it has been determined in step 704 that the label j is not wider than its segment the control directly goes from step 704 to step 712.

In step 712 a determination is made whether the label j overlaps with label j−1. If this is not the case the control goes to step 714 where any staggering that may have taken place with previous labels is stopped at label j−1. Otherwise the control goes from step 712 to step 716 where a determination is made whether the label j is more than half as wide as its column. In other words, a determination is made whether the constraint as explained with respect to FIG. 7 is met or not. If the constraint is not satisfied the control goes from step 716 to step 708, otherwise to step 718.

In step 718 it is checked whether a labeled segment below the label j exists that has a label which is placed above the column. If this is the case the control goes to step 708 otherwise to step 720 where staggering is performed with label j−1. From step 720 the control goes to step 722 where it is determined if the label j is the last label. If this is the case the labeling has been completed and processing stops in step 724. Otherwise j is incremented in step 726 and the control goes back to step 704.

From step 714 the control goes to step 728 where it is determined whether any two labels j and j+2 in the staggering overlap. If this is not the case the control goes to step 722, otherwise to step 730.

In step 730 the label of the smallest segment in the staggering is called label j. From there the control goes to step 708. In step 708 it is determined whether the label j is wider than the available space next to its column. In other words it is determined whether the constraint as explained with respect to FIG. 8 is satisfied or not. If the label is in fact wider than the available space the control goes to step 732 where the label j is placed above its column, otherwise to step 734.

In step 734 a determination is made whether a labeled segment below label j exists which is labeled above the column. If this is the case the control goes to step 732 otherwise to step 736 where the label j is placed next to its column. From step 736 the control goes back to step 702.

From step 732 the control goes to step 738 where a determination is made whether any labeled segment below label j exists that is labeled next to the column. If this is not the case the control goes back to step 702, otherwise to step 740 where these labels are placed above the column as well.

The embodiment of the labeling algorithm considered here is thus composed of three main processing phases: A first processing phase from step 702 to step 730 for placing labels onto their respective segments if possible without violating the defined constraints; a second processing phase from step 708 to step 736 for placing labels next to the column if possible without violating the defined constraints; and a third processing phase from step 732 to step 740 for marking labels to be placed above the column if necessary to avoid any violation of constraints. An algorithm for the actual placement of labels on top of columns itself is described below and illustrated in FIG. 13.

Figure 12:
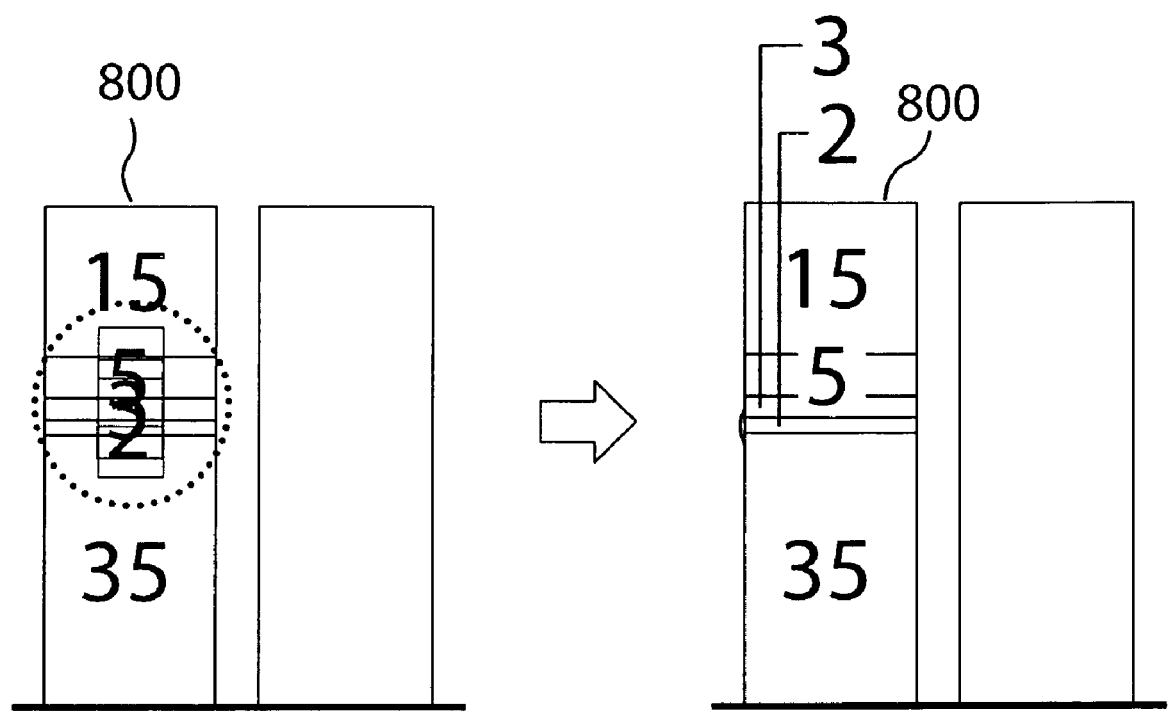
FIG. 12 shows an example of a labeled column chart being generated in accordance with the embodiment of the labeling algorithm of FIG. 11.

FIG. 12 illustrates application of the labeling algorithm of FIG. 11 to labeling of a column 800 of a column chart. The column 800 has column segments with labels '35', '2', '3', '5' and '15' (from the baseline of the column 800 to the top). On the right of FIG. 12 the result of the application of the labeling algorithm to the column 800 is depicted.

Figure 13:
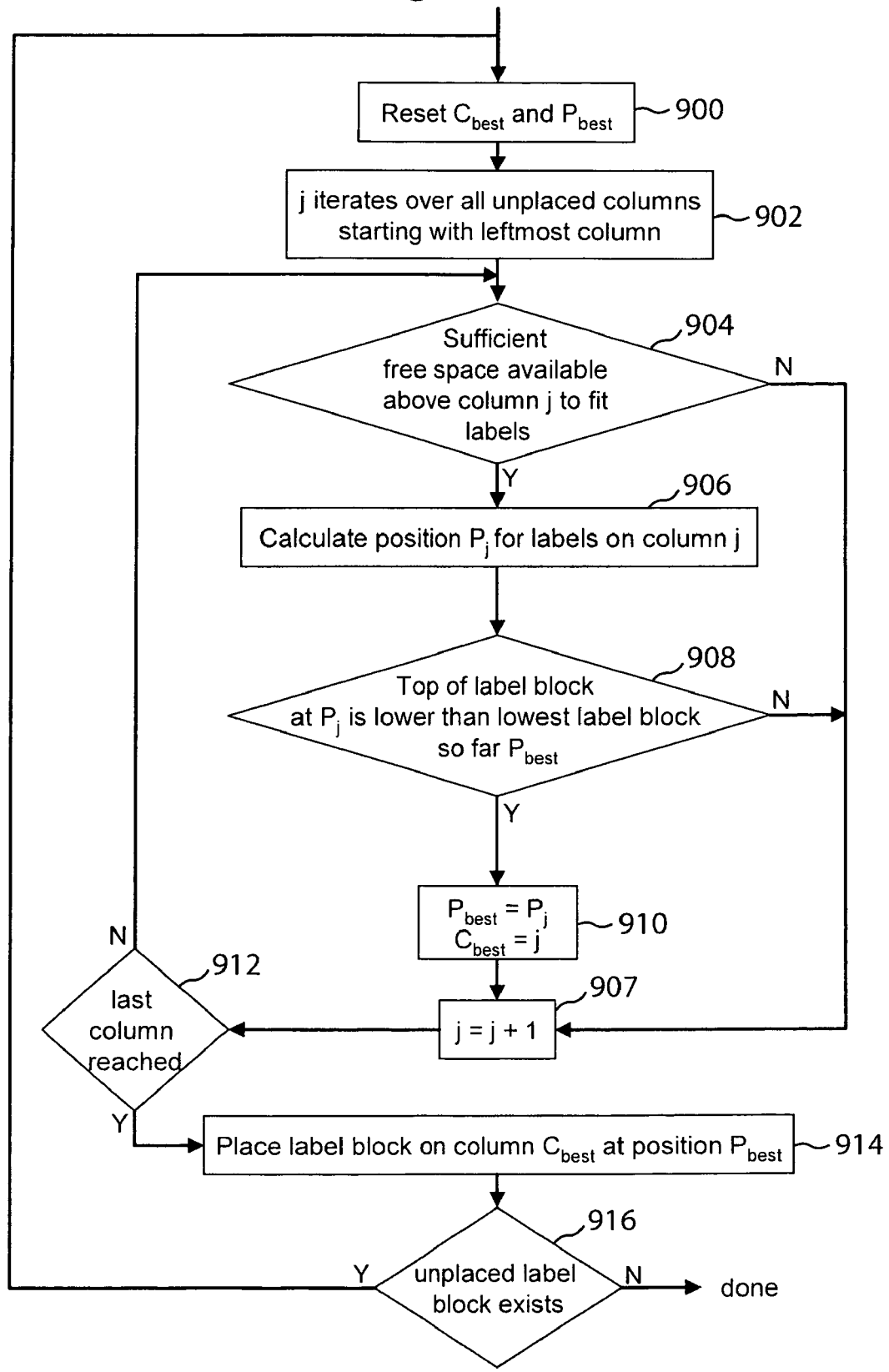
FIG. 13 is a flowchart illustrating an embodiment of an algorithm for placing label blocks above columns.

FIG. 13 is a flowchart illustrating an algorithm for placing label blocks above the columns. These labels may be marked as to be placed above the columns by another algorithm, for example the one described previously and illustrated in FIG. 11. The algorithm determines the order in which the label blocks will be placed above their columns. It iterates over all columns with unplaced labels from left to right. For each column with sufficient free space on top, it calculates the position $P_j$ of the column's associated label block. The label block at position $P_j$ must not intersect label blocks that have already been placed above other columns, columns itself, nor any other label not placed on top of its column. Among all the label blocks whose position has been calculated, the one to be placed next is the label block with the lowest top side. The algorithm continuously keeps track of the column with the lowest label block in variable $C_{best}$ and of the corresponding label block position in $P_{best}$. In step 900 the variables $C_{best}$ and $P_{best}$ are first reset. In step 902 j iterates over all unplaced columns starting with the left-most column. In step 904 the determination is made whether sufficient free space is available above the column j to fit labels. If this is not the case, the index j is incremented in step 907; otherwise the control goes from step 904 to step 906 where the best position $P_j$ for the label block on column j is calculated.

From step 906 the control goes to step 908 where it is determined whether the top of the label block at $P_j$ is lower than the top of the lowest label block so far at $P_{best}$. If this is not the case the control goes to step 907; otherwise the control goes to step 910, where $P_{best}$ is set to $P_j$ and $C_{best}$ is set to j.

From step 910 the control goes to step 907 and from there to step 912. In step 912 a determination is made whether the last column has been reached. If this is not the case the control goes back to step 904 otherwise the control goes to step 914 where the label block with the lowest top side is placed on column $C_{best}$ at position $P_{best}$. From there the control goes to step 916. If an unplaced label block still exists the control goes back to step 900.

Figure 14:
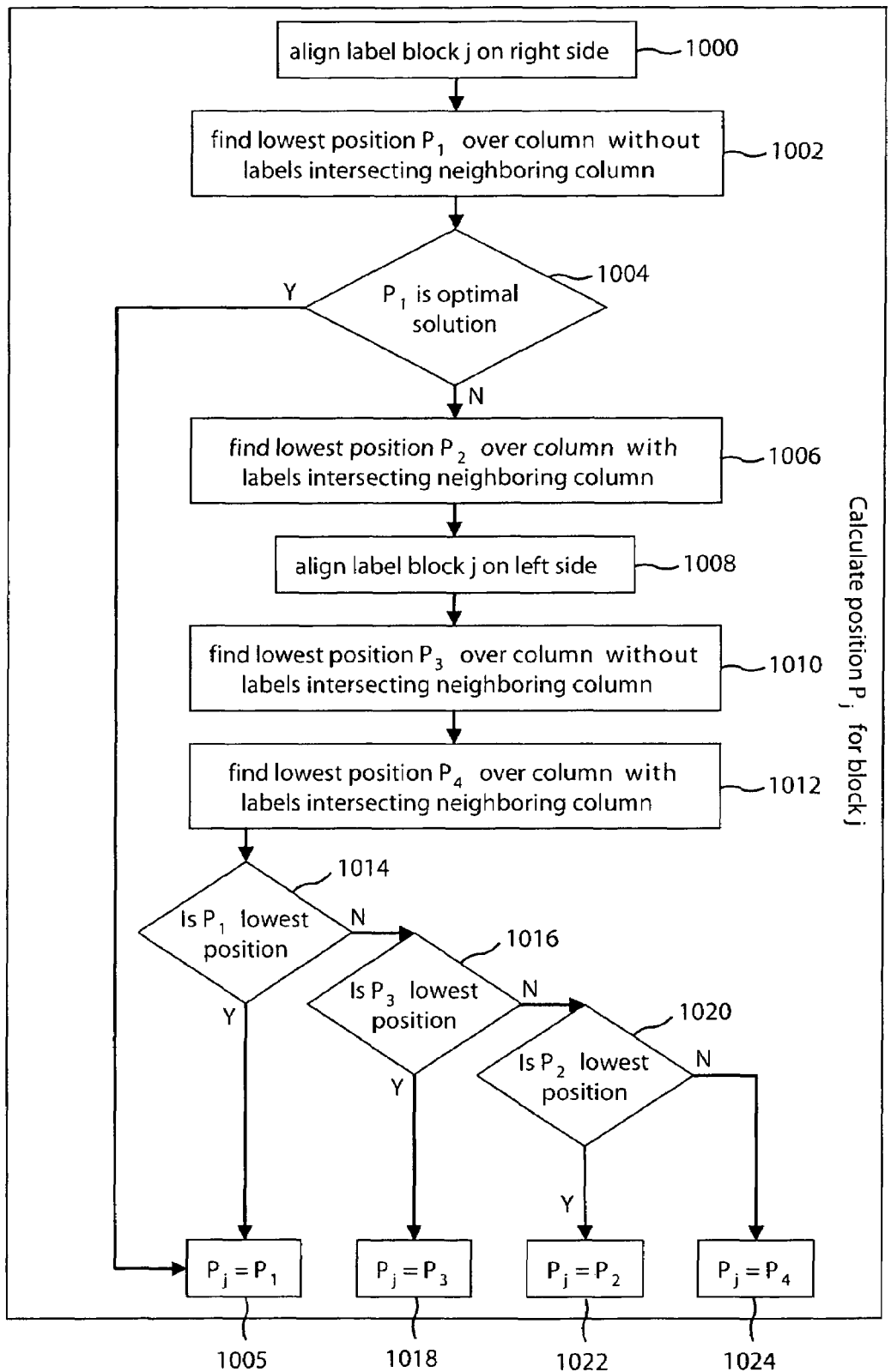
FIG. 14 is a flowchart illustrating an implementation of a candidate position determination method for label blocks in the flowchart of FIG. 13.

FIG. 14 shows a flowchart for implementing step 906 in the flowchart of FIG. 13. The algorithm determines the best possible position $P_j$ of label block j and the best alignment of the labels contained in the block. The label block position should be as low as possible, i.e., as close as possible to the corresponding column. Additionally, the label block must not intersect other labels. Normally, the label block must not intersect other columns but this restriction can be relaxed in order to improve the visual appearance. The flowchart depicts this extended version. In step 1000 all label blocks j are aligned on the right side. In step 1002 the lowest position $P_1$ over a column without labels intersecting the neighboring column is found.

In step 1004 a determination is made whether the position $P_1$ is an optimal solution, i.e., if the position $P_1$ is directly on top of the column. If this is the case the control goes to step 1005 where $P_j$ is set to $P_1$. Otherwise the control goes to step 1006 where a lowest position $P_2$ over column with labels intersecting the neighboring column is found.

In step 1008 the label block j is aligned on the left side. In step 1010 the lowest position $P_3$ over a column without labels intersecting a neighboring column is found. In step 1012 the lowest position $P_4$ over a column with labels intersecting a neighboring column is found.

Among the four possible label positions $P_1$, $P_2$, $P_3$, $P_4$ the algorithm chooses the preferred position in steps 1014 to 1024. In step 1014 a determination is made whether $P_1$ is the lowest position. If this is the case the control goes to step 1005; otherwise the control goes to step 1016 where a determination is made whether $P_3$ is the lowest position. If this is the case the control goes to step 1018 where $P_j$ is set to be equal $P_3$. Otherwise the control goes to step 1020 where a determination is made whether $P_2$ is the lowest position. If this is the case the control goes to step 1022 where $P_j$ is set to be equal $P_2$. Otherwise the control goes from step 1020 to step 1024 where $P_j$ is set to be equal $P_4$.

While the above described embodiments have been explained with respect to column charts that have vertically oriented segments, it is to be noted that the present invention can also be applied to bar charts.

LIST OF REFERENCE NUMERALS

| | |
|---|---|
| 100 | Computer system |
| 102 | Memory |
| 104 | Label content data |
| 106 | Label format data |
| 108 | Chart geometry data |
| 110 | Microprocessor |
| 112 | Presentation program instructions |
| 114 | Labeling program instructions |
| 116 | Graphical user interface (GUI) program instructions |
| 118 | Monitor |
| 120 | Keyboard |
| 122 | Computer mouse |
| 400 | Column |
| 402 | Baseline |
| 404 | Column segment |
| 406 | Column segment |
| 408 | Column segment |
| 410 | Label |
| 412 | Label |
| 414 | Label |
| 416 | Text field |
| 418 | Cursor |
| 500 | Column |
| 504 | Column segment |
| 506 | Column segment |
| 508 | Column segment |

-continued

| | |
|---|---|
| 510 | Label |
| 510' | Label |
| 512 | Label |
| 514 | Label |
| 514' | Label |
| 520 | Line |
| 521 | Column width |
| 524 | Column segment |
| 526 | Column segment |
| 528 | Column segment |
| 530 | Column segment |
| 532 | Column segment |
| 534 | Label |
| 536 | Label |
| 538 | Label |
| 539 | Connector symbol |
| 540 | Label |
| 800 | Column |

The invention claimed is:

1. A display method comprising:

displaying a labeled column chart on a graphical user interface, the column chart having a plurality of labels and at least a first column and a second column, each column having at least one column segment and each label being assigned to one of the column segments;

entering a first modification of one of the plurality of labels via the graphical user interface;

starting execution of labeling instructions that implement a labeling algorithm for generating a first modified labeled column chart in response to entry of the first modification, wherein the labeling instructions are adapted to perform labeling to satisfy constraints of:

a) a label that is placed on its assigned column segment does not intersect with another label, b) a label that has a size and shape completely covering its assigned column segment is not placed on its assigned segment but next to its column or above its column, c) a first and a second of the labels of a same one of the columns can only be staggered horizontally if none of the first and second labels is wider than half a column width of one of the columns, d) a label can only be placed between the first and second columns if a space between the first and second columns is wider than that of the label, e) if a first label that is assigned to a first column segment has been placed above its column no second label being assigned to a second column segment that is located above the first segment can be placed between the first and second columns;

connecting the first label that is placed above its column to its assigned segment by a line or connector symbol crossing a top portion of that column, the labeling instructions being adapted to perform the labeling such that the following constraints are satisfied with respect to labels being assigned to segments within the top portion:

(f) labels assigned to column segments within the top portion must not be staggered horizontally, (g) a label being assigned to one of the segments of the top portion that is wider than its assigned segment is placed above its column regardless of its height; and displaying the first modified labeled column chart on the graphical user interface.

2. The display method of claim 1, wherein each of the labels is contained in a graphical object, the method further comprising opening one of the graphical objects via the graphical user interface, and entering the first modification of one of the labels into the open graphical object.

3. The display method of claim 2, wherein the execution of the labeling instructions is started while the graphical object is still open.

4. The display method of claim 3, further comprising entering a second modification of one of the labels into the open graphical object, terminating execution of the labeling instructions if generation of the modified labeled column chart in response to the entry of the first modification has not been completed when the second modification is entered, and restarting the execution of the labeling instructions for generating a second modified labeled column chart in response to the entry of the second modification, wherein the second modified column chart is displayed on the graphical user interface instead of the first modified labeled column chart.

5. The display method of claim 4, wherein the execution of the labeling instructions is restarted in response to entry of each subsequent modification of one of the labels for generating a respective modified labeled column chart.

6. The display method of claim 1, wherein the execution of the labeling instructions is performed within a time duration of below 500 milliseconds.

7. The display method of claim 1, wherein the first modification is entered by a single user input action and the execution of the labeling instructions is started automatically in response to the single user input action.

8. The display method of claim 7, wherein the single user input action is a keystroke.

9. A display method comprising:
   displaying a labeled column chart on a graphical user interface, the column chart having a plurality of labels and at least a first column and a second column, each column having at least one column segment and each label being assigned to one of the column segments;
   entering a first modification of one of the plurality of labels via the graphical user interface;
   starting execution of labeling instructions that implement a labeling algorithm for generating a first modified labeled column chart in response to entry of the first modification, wherein the labeling instructions are adapted to perform labeling to satisfy constraints of:
   a) a label that is placed on its assigned column segment does not intersect with another label,
   b) a label that has a size and shape completely covering its assigned column segment is not placed on its assigned segment but next to its column or above its column,
   c) a first and a second of the labels of a same one of the columns can only be staggered horizontally if none of the first and second labels is wider than half a column width of one of the columns,
   d) a label can only be placed between the first and second columns if a space between the first and second columns is wider than that of the label,
   the labeling instructions being further adapted to process the labels sequentially starting with a label being assigned to a lowest column segment of one of the at least first and second columns, wherein in a first processing phase the labeling instructions attempt to place a processed label on its assigned segment, in a second processing phase an attempt is made to place a processed label next to its column, and in a third processing phase a processed label is placed above its column if it cannot be placed on its assigned segment or next to its column; and
   displaying the first modified labeled column chart on the graphical user interface.

10. The display method of claim 9, wherein each of the labels is contained in a graphical object, the method further comprising opening one of the graphical objects via the graphical user interface, and entering the first modification of one of the labels into the open graphical object.

11. The display method of claim 10, wherein the execution of the labeling instructions is started while the graphical object is still open.

12. The display method of claim 11, further comprising entering a second modification of one of the labels into the open graphical object, terminating execution of the labeling instructions if generation of the modified labeled column chart in response to the entry of the first modification has not been completed when the second modification is entered, and restarting the execution of the labeling instructions for generating a second modified labeled column chart in response to the entry of the second modification, wherein the second modified column chart is displayed on the graphical user interface instead of the first modified labeled column chart.

13. The display method of claim 12, wherein the execution of the labeling instructions is restarted in response to entry of each subsequent modification of one of the labels for generating a respective modified labeled column chart.

14. The display method of claim 9, wherein the execution of the labeling instructions is performed within a time duration of below 500 milliseconds.

15. The display method of claim 9, wherein the first modification is entered by a single user input action and the execution of the labeling instructions is started automatically in response to the single user input action.

16. The display method of claim 15, wherein the single user input action is a keystroke.

\* \* \* \* \*